United States Patent [19]
Pfaffmann

[11] Patent Number: 4,744,836
[45] Date of Patent: * May 17, 1988

[54] METHOD FOR SELECTIVELY HEATING A WORKPIECE SUBJECTED TO LOW TEMPERATURE THERMOMECHANICAL PROCESSING

[75] Inventor: George D. Pfaffmann, Farmington, Mich.

[73] Assignee: Tocco, Inc., Boaz, Ala.

[*] Notice: The portion of the term of this patent subsequent to Jan. 20, 2004 has been disclaimed.

[21] Appl. No.: 6,142

[22] Filed: Jan. 23, 1987

Related U.S. Application Data

[60] Continuation-in-part of Ser. No. 899,323, Aug. 22, 1986, Pat. No. 4,715,907, which is a division of Ser. No. 752,550, Jul. 8, 1985, Pat. No. 4,637,844.

[51] Int. Cl.$^4$ .............................................. C21D 8/00
[52] U.S. Cl. ................................ 148/12 R; 148/12 F; 148/12.4; 148/150
[58] Field of Search ...................... 148/150, 154, 12.4, 148/12 R, 12 F, 12.1, 144, 145, 147

[56] References Cited

U.S. PATENT DOCUMENTS 4,373,973  2/1983  Cellitti ................................ 148/124
4,637,844  1/1987  Pfaffman ............................ 148/150

Primary Examiner—Christopher W. Brody
Attorney, Agent, or Firm—Body, Vickers & Daniels

[57] ABSTRACT

Process and apparatus are provided for selective heating a portion of a workpiece to achieve improved ausforming and isoforming processes when the workpiece is plastically deformed by mechanical working above the $M_s$ temperature. The process and apparatus includes a preheating step where a larger portion of the workpiece is preheated to less than the austenitic critical temperature while the final heating step conducted at a temperature higher than the austenitic critical temperature heats a smaller portion of the workpiece which is subsequently subjected to plastic deformation.

17 Claims, 12 Drawing Sheets

FIG. I

LOW TEMPERATURE AUSFORMING

METHOD FOR SELECTIVELY HEATING A WORKPIECE SUBJECTED TO LOW TEMPERATURE THERMOMECHANICAL PROCESSING

This is a continuation-in-part of application Ser. No. 899,323, filed on Aug. 22, 1986 now U.S. Pat No. 4,715,907 which in turn is a division of application Ser. No. 752,550, filed on July 8, 1985, which has been allowed as a patent as of Apr. 24, 1986, now U.S. Pat. No. 4,637,844.

BACKGROUND

This invention is particularly applicable to an apparatus and a method for inductively heating a predetermined portion of a ferrous workpiece and thereafter mechanically deforming the workpiece shape of the heated portion to finish-like tolerances while imparting desired physical properties to such workpiece in an interrupted quench process and will be described with particular reference thereto; however, the invention has broader applications and may be used with any apparatus or process which is capable of selectively heating, in a precisely controlled manner, a predetermined portion of a metal workpiece so as to permit mechanical shaping of the heated portion of the workpiece at a predetermined temperature to impart desired physical properties to such workpiece portion in subsequent surface heat treatments thereof.

The invention will be described with reference to a ferrous workpiece and particularly with respect to plain carbon type steels and alloyed steels which have already been subjected to a case hardened heat treat process. In accordance with broader aspects of the invention however, any metal, ferrous or non-ferrous, which is allotropic or polymorphic may have physical characteristics which can be modified by the low temperature thermomechanical treatment used after selective contour heating of the workpiece.

Isothermal time, temperature transformation curves (hereinafter "isothermal transformation curves") for plain carbon and alloy steels have long been the foundation for heat treating processes for such steels to control their physical properties as well as workpiece distortion, dimensional variation, quench cracking, etc. When the workpiece is a gear, cam, bearing, shaft or the like which is subjected to high contact stresses with other parts, an especially hard, tough, smooth surface must be formed on the case and generally, machine finished within close tolerances. Apart from those heat treat operations which change the chemical composition of the case (such as nitriding), such workpieces are generally produced by infusing or dispersing carbon into the case (at least for low carbon steels) in heat treat operations conventionally known as carburizing, and carbonitriding which are followed by cooling the workpiece from an elevated temperature above the $A_3$-$A_{cm}$ temperature to some final temperature at a rate determined by the isothermal transformation curve to achieve certain physical properties. As used hereafter, the phrase "austenitic critical temperature" or "austenitic temperature" will mean that stable temperature whereat austenite or gamma iron will exist as a face-centered cubic structure which for iron and carbon irons is shown as the $A_3$-$A_{cm}$ transformation temperature curve on the iron-carbon phase diagram.

To minimize quench cracks, control distortion and obtain certain desired physical properties related to the grain size of the workpiece, several interrupted quench processes, commonly known as austempering and marquenching have heretofore been used after the workpiece has been carburized. In conjunction with such interrupted quenches, it has also been known for some time that the tensile strength and ultimate strength of high hardenability steels can be significantly increased without loss of ductility by mechanically working or deforming the workpiece in the bainite temperature range of the isothermal transformation curve immediately followed by an oil quench to prevent the formation of non-martensitic transformation products. Such treatment is commonly known as the Ausform Process. More recently, an enhancement in the Ausform Process is disclosed in U.S. Pat. No. 4,373,973 for carburized gears.

In the '973 patent, a gear steel having certain isothermal transformation curve characteristics, after carburizing, is reheated above the austenitic critical temperature and allowed to cool (at a rate sufficient to pass, without contacting, the "knee" of the isothermal transformation curve, (i.e., the "critical cooling rate") to a temperature just above the $M_s$ temperature (i.e., the temperature at which martensite just begins to form and generally shown as the isothermal transformation curve) in a liquid bath whereat the gear teeth are swage-rolled (mechanically worked) while the gear remains in the metastable austenitic condition (i.e., the "ausrolling" process). Ausrolling provides the necessary plastic deformation of the workpiece which importantly must occur before sufficient time has elapsed (in the bay region of the isothermal transformation curve) to allow any phase transformation. Upon completion of the swage-rolling, the gear is then permitted to air cool or is oil quenched to the martensitic range followed by a conventional tempering process. It was found that in gears which were formed from steels having sufficient isothermal transformation curve characteristics to permit ausrolling, there was a fine dispersion of carbides formed during the rolling/swaging operation and that the grain size of the austenite was stabilized to produce a very high dislocation density in the final martensite which was rather uniformly dispersed throughout the surface. Importantly, the grain size and carbon dispersion produced a very smooth surface which could be closely controlled to finish tolerances. As a result, several finish machining type operations now required to manufacture close tolerance gears could be eliminated.

Heretofore, the ausrolling process was limited to those steels having a sufficiently long metastable austenitic range to permit sufficient swage-rolling of the gear to achieve the desired level of plastic deformation. The deformation level must be substantial, typically in a range in excess of 60%, to achieve the desired characteristics. When the workpiece is through heated or even partially through heated by means of conventional standard atmosphere or vacuum furnaces, to a temperature above the austenitic critical temperature, it is difficult to achieve such level of plastic deformation uniformly throughout the surface of the part. That is, if the swage-rolling or mechanical deformation occurs before the workpiece has attained, throughout its core, the desired temperature beneath the knee of the isothermal transformation curve, the metal at the surface of the part where the mechanical working occurs will press against the yielding hotter metal at the core of the workpiece (since the surface will cool before the core does) and deform in a non-uniform manner. If the swage-rolling operation is delayed until homogenization does occur, the time for the plastic deformation operation is reduced (because the phase transformation will occur at a given time) and higher die forming pressures are required with attendant increases in energy costs.

THE INVENTION OF PRIOR APPLICATION

As noted above, in the conventional interrupted quench processes, a substantial portion of the workpiece must be heated above the upper critical temperature and that portion is then cooled at a critical cooling rate in some liquid bath maintained at or above the $M_s$ temperature. The workpiece must remain in the bath until the temperature throughout the part is homogenized and this time must be achieved, for any particular steel within the time limits dictated by that particular steel's isothermal transformation curve. In accordance with the present invention of the prior application, there is disclosed a preheat furnace which raises the temperature of the workpiece only to that of approximately the $M_s$ temperature and an induction coil is used to heat only the contour of the workpiece above the austenitic critical temperature to a small case depth. When the workpiece is then quenched at some temperature below the austenitic critical temperature but above the $M_s$ temperature, there are several advantages which occur. First, the workpiece which is inductively heated has the same physical and chemical properties in its case as does workpieces treated under the conventional processes. Secondly, the cooling and importantly the rate of cooling of the workpiece is significantly enhanced since the contour of the workpiece is cooled not only by the bath but also by the interior surface of the piece. This permits higher critical cooling rates to be achieved, thus making the process more suitable to steels using less alloying elements than heretofore possible since the knee of the isothermal transformation curve need not be shifted by the addition of alloying elements. Third, the overall energy requirements are reduced since only a small portion of the workpiece is heated to the critical temperature. Also, since there is less heat inputed into the steel, there is less heat to be dissipated in the bath which makes for a more precisely controlled process. Fourth, since the inner portion of the workpiece is not raised above the upper critical temperature, there is less tendency for the part to experience decarburization, oxidation, grain growth and distortion. In summary, the prior application imparted to the surface of the workpiece physical properties and metallurgical characteristics dictated solely by the isothermal transformation curve and identical to that heretofore achieved when the workpiece was subjected to through heating, but in a much enhanced and expanded process possessing the noted features and capabilities.

THE PRESENT INVENTION

In accordance with the present invention, the applicability of the ausforming and ausrolling processes to various metals and industrial applications and also the use of such processes in "isoforming" applications (defined herein as a thermomechanical process wherein the workpiece is mechanically deformed, in a plastic state, in whole or in part, outside of the metastable austenitic range) is materially enhanced by a method which preheats a selected first portion of the workpiece to a temperature at least equal to the approximate $M_s$ temperature but less than the austenitic critical temperature for the workpiece; heating a second portion of the workpiece to a temperature at least equal to the austenitic critical temperature for the workpiece, the second portion being smaller than and contained within the first portion of the workpiece; forming the desired shape of the workpiece by means of a shaping tool which mechanically deforms the second portion of the workpiece before the second portion drops below the $M_s$ temperature and then cooling the workpiece below the $M_s$ temperature. The selective heating profile thus generated provides a pinching effect in that the hot material of the first portion is substantially more ductile than the temperature of the second portion of the workpiece which has not undergone any phase transformation and which acts as a mandrel for the hotter surface metal. The hot selectively pinched material thus becomes the only material which is plastically deformed to the desired limits during the swage-rolling (or die forming) operation. This method thus increases or expands the range of ferrous metals which can be commercially subjected to the ausrolling, ausforming and isoforming processes in at least two ways. First, because there is less material which is heated above the austenitic critical temperature, there is less material to cool. This means that more critical cooling rates can be achieved with the present invention. Secondly, the time for the swage-rolling or die forming operation is significantly reduced, thus increasing the availablity of metals and also other manufacturing processes which can be improved or enhanced by mechanically forming to finish or near finish shape the workpiece at elevated temperatures. It is to be understood that the manufacturing processes under discussion extend to and include not only carburized steel but also other steels and iron that have been subjected to case hardening operations such as cyaniding, nitriding and carbo-nitriding.

In accordance with another aspect of the invention, the apparatus for finish forming and heat treating an iron carbide workpiece would comprise preheating means for heating a first portion of said workpiece to a temperature approximately equal to the $M_s$ temperature of the workpiece; final heating means for heating a second portion of the workpiece to a temperature at least equal to the austenitic critical temperature of the workpiece, the second portion of the workpiece being smaller than and contained within the first portion of the workpiece; die forming means for forming the second heated portion of the workpiece in its plastic state, and means for cooling the workpiece after it has been shaped.

While in the invention's broader sense, any means for selectively heating a portion of the workpiece can be employed such as laser heating techniques or vacuum arc heating, or even the various glow discharge techniques using plasma arcs, it is specifically contemplated that induction heating has ideal utilization in commercial applications of the present invention. In one form of the invention, the method and apparatus would include a single induction heating coil with a workpiece receiving opening adapted to surround in closely spaced relationship the second portion of the workpiece which is already preheated to a temperature approximately that of the $M_s$ temperature (either by means of a separate preheat furnace or by means of the liquid bath), which selectively heats the second portion of the workpiece to the austenitic critical temperature to achieve the desired plastic deformation noted above. In this manner, not only will the plastic deformation occur within limited time spans, but the deformation will be achieved at the desired portion of the workpiece such as the fillet of a gear tooth (which is located radially inwardly from the outer edge of the gear).

In accordance with another aspect of the subject invention, the induction heating unit is provided with first and second coils generally matching but slightly larger in diameter than the second portion of the workpiece to be heated. The first coil heats the workpiece with a low radio frequency to provide a substantial heating depth encompassing the second portion of the workpiece and insuring that the second portion of the workpiece is heated to the $M_s$ temperature. The workpiece is then immediately moved into the second coil which is operated at high radio frequency to raise the temperature of the first portion of the workpiece beyond the austenitic critical temperature. A time delay between the heating steps (and there may be several preheating steps) is utilized and means for rotating the workpiece within the inductor coils is provided. Such an induction coil arrangement is disclosed in co-pending application Ser. No. 878,186, filing date June 25, 1986 assigned to the present assignee. By using the two coil induction heating arrangement thus described in the present invention, the ability of the process to achieve the desired plastic deformation is enhanced since the core of the workpiece may be at a lower temperature than the second portion of the workpiece, thus increasing the pinching effect on the second portion of the workpiece to achieve the plastic deformation during mechanical working of the workpiece. Additionally, a separate preheat furnace to raise the through temperature of the workpiece to the $M_s$ temperature is not necessary. The dual coil arrangement also permits the first portion of the heated workpiece to be located away from or removed from the circumference or outer edge of the workpiece. In this manner, only a desired portion of the workpiece, i.e., a fillet, may be heat treated in accordance with the present invention.

While in accordance with the preferred embodiment of the present invention, the workpiece would be immediately submersed in the liquid bath after final heating to undergo the die forming process described above, in accordance with another aspect of the present invention, believed particularly suited to isoforming processes, the forming tool is positioned immediately adjacent the high frequency inductor coil. As the workpiece is progressively heated as it passes through the inductors and when it emerges from the high frequency coil it is immediately mechanically worked or deformed and progressively so until the entire depth of the second portion of the workpiece is thermomechanically processed. Such progressive heating or scanning process is illustrated in a recently filed continuation-in-part application of application Ser. No. 878,186, filed June 25, 1986 (hereby incorporated by reference) wherein large parts of a large workpiece (i.e., teeth of a large gear having a significant depth or axial length) are preheated by low frequency induction coils and then finally heated by an induction coil to above the austenitic critical temperature and then quenched as the gear is progressively moved through the inductor coils in a scanning process. Control provision may be made to the forming tool or die to sense appropriate levels of resistance and retract the workpiece into the inductor coils to reheat a portion of the workpiece above the upper critical temperature level if the forming operation cannot proceed within the time limits of the particular isoforming process desired.

It is thus the principal object of the present invention to provide a selective heating process and apparatus, as defined above, to permit ausforming, ausrolling and isoforming processes to occur over a larger range of materials and/or geometries than heretofore possible.

Another obJect of the present invention is to provide method and apparatus, as defined above, which permits closer finish tolerances to be maintained in ausrolling, ausforming or isoforming processes than heretofore possible by utilizing selective heating of the workpiece.

A further obJect of the subJect invention is to reduce the total energy otherwise required in through heating heretofore required in low temperature thermomechanical processes under consideration, thus providing a dimensionally more stable workpiece for mechanical working and providing greater precision of dimensional control in the final shape of the workpiece.

Yet another object of the present invention is to provide a more economical system for ausforming, ausrolling or isoforming processes than heretofore employed by using process and apparatus as defined herein which eliminate the need for separate or additional means for through preheating of the workpiece.

Still another object of the present invention is the provision of a method and apparatus, as defined above, which contemplates, preferably in an isoforming process, the mechanical working or plastic deformation of a workpiece without the need of a liquid bath, thus minimizing the capital expenditure required for such processes.

Another object of the subject invention is to provide, in the apparatus and process as defined above, a more economical, energy efficient, method and apparatus for inductively heating the workpiece than would otherwise be required.

Still a further object of the present invention is the provision of a method and apparatus, as defined above, which substantially improves the productivity of an ausforming, ausrolling or isoforming process by means of selective heating.

Yet another object of the present invention is the provision of a method and apparatus, as defined above, which utilizes multi-cycle and multi-frequency processing techniques in induction heating to selectively heat the contour of a workpiece to enhance the surface qualities obtained in the workpiece by ausforming, ausrolling or isoforming processes, while significantly increasing the surface hardness of the workpiece.

These and other objects and advantages will become apparent from the following description, taken together with the accompanying drawings discussed in the next section.

DETAILED DESCRIPTION OF THE INVENTION

Figure 1:
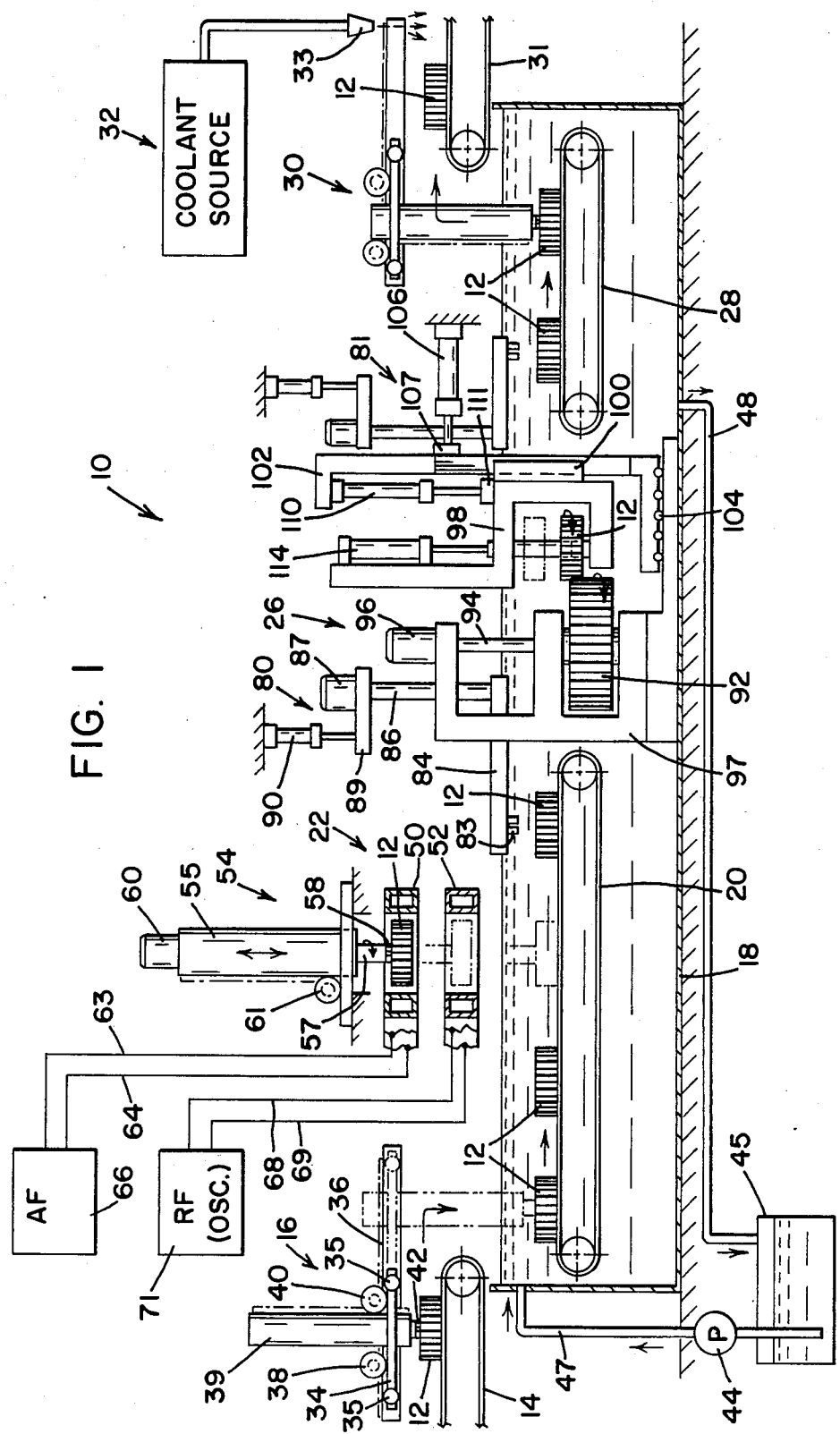
FIG. 1 is a fragmentary, schematic side elevational view illustrating the preferred embodiment of the present invention.

Referring now to the drawings wherein the showings are for the purpose of illustrating a preferred embodiment of the invention and not for the purpose of limiting same, FIG. 1 illustrates apparatus 10 for thermomechanically processing at low temperatures a ferrous workpiece 12 moving along a horizontal conveyor path. In the preferred embodiment, workpiece 12 is a hobbed, 31 tooth, 8.5 diametral pitch gear formed from a carburized 9310 steel having an initial gear quality of AGMA 8. However, as noted above, any hypereutectoid, hypoeutectoid, or eutectoid steel or nodular iron, whether or not case hardened by conventional processes such as carburizing, nitriding, etc. may be used as material for the workpiece which may be formed in a wide variety of machine elements such as cams, roller, shafts, splines, bearings, etc.

Apparatus 10 generally comprises an entry work transfer station 16; a liquid bath tank 18 which receives the workpiece 12 from entry work transfer station 16; a first tank conveyor 20 within tank 18 for conveying the work therein; heating means 22 for removing workpiece 12 from tank 18 and heating the workpiece to its austenitic critical temperature and then returning workpiece 12 back into tank 18; die forming means 26 which takes the workpiece 18 from conveyor 20 and mechanically forms the workpiece while it is in a plastic state to a finished shape; a second conveyor 28 within tank 18 for receiving the workpiece from die forming means 26 and moving workpiece 12 to the exit end of the apparatus; an exit work transfer station 30 similar to entry work transfer station 16 for removing the workpiece from tank 18, and a cooling source 32 adjacent the exit work station 30 for cooling workpiece 12.

Workpiece 12 enters apparatus 10 by means of entry conveyor 14. In the preferred embodiment, workpiece 12 has been subjected to a conventional carburizing process followed by atmosphere or furnace cooling and is at ambient temperature when it enters apparatus 10 via conveyor 14.

The entry work transfer station 16 comprises a platform 34 supported by bearings 35 which roll in a horizontal track 36 suitably secured to a framework not shown. A rack and pinion drive unit 38 moves the platform 34 between the illustrated positions shown in FIG. 1. Relative to platform 34 is a cylindrical sleeve 39 movable in a vertical direction by rack-pinion drive arrangement 40. At the end of sleeve 39 is a collet 42. Collet 42 may be any suitable fluidly or mechanically actuated device having jaws which fit into the hub of the gear and expand outwardly by suitable control means to engage and disengage the workpiece 12 (not shown).

Liquid bath tank 18 is a conventional quenching tank holding any suitable liquid media which is capable of being maintained at a temperature above the $M_s$ temperature of the workpiece. It is contemplated that a molten salt bath with appropriate silicone base fluids will be utilized. A pump 44 is provided for recirculating the bath medium from a reservoir 45 between the inlet 47 and outlet 48 lines of the tank 18. Conventional bath sensing temperature means, bath agitation mechanisms and heating means for maintaining the liquid media of the bath at an appropriate temperature are utilized but not shown.

After workpiece 12 is transferred from inlet conveyor 14 by transfer mechanism 16, it is placed in the tank 18 on conveyor 20 and moves to the heating station 22. It should be noted that while workpiece 12 remains in liquid bath tank 18, it is being preheated to a temperature which depends on the temperature of the liquid bath and the time the workpiece remains in the bath. Reference may now be had to FIGS. 1, 2, 3 and 4 for a description of the heating means 22 which comprise a first preheater inductor 50, a second, final heat inductor 52 and a support structure generally indicated at 54 for rotating and vertically moving workpiece 12 from a first position within the first preheat inductor 50 to a second position within second final heat inductor 52 to a third position on conveyor belt 20 as schematically illustrated in FIG. 1. The support structure 54 schematically includes a cylindrical sleeve 55 housing, a shaft 57 containing an expandable collet 58 (similar to collect actuator 42) for grabbing and releasing workpiece 12. Shaft 57 is rotated when either inductor 50, 52 is energized by motor 60. A rack and pinion drive arrangement 61 controlled by a microprocessor (not shown) raises and lowers cylindrical sleeve 55 between the three positions illustrated.

Figure 2:
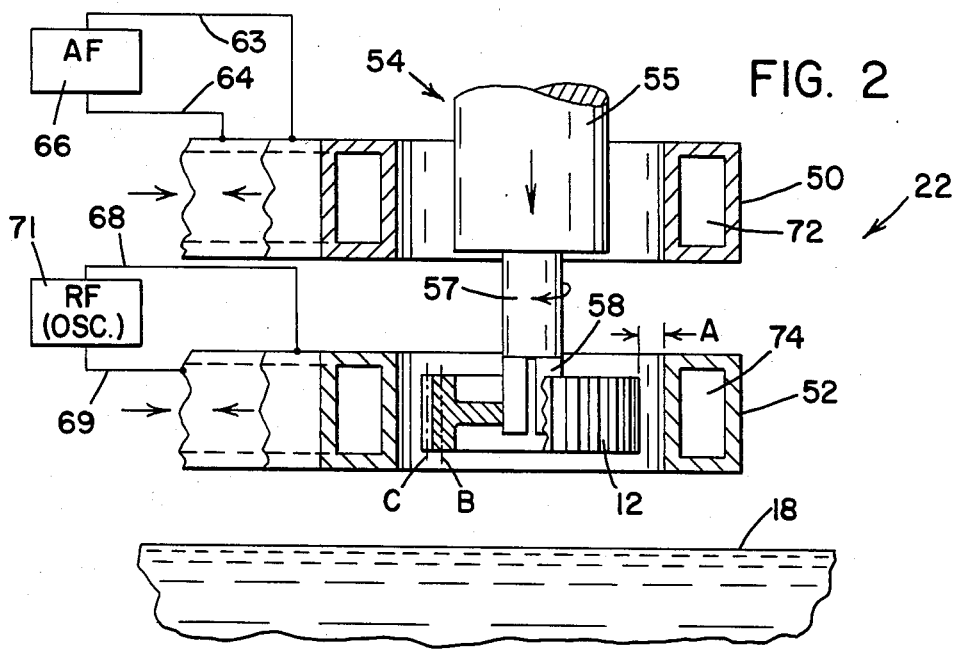
FIG. 2 is an enlarged, partially cross-sectioned, schematic view of the induction coils of the present invention with the workpiece positioned therein.
Figure 3:
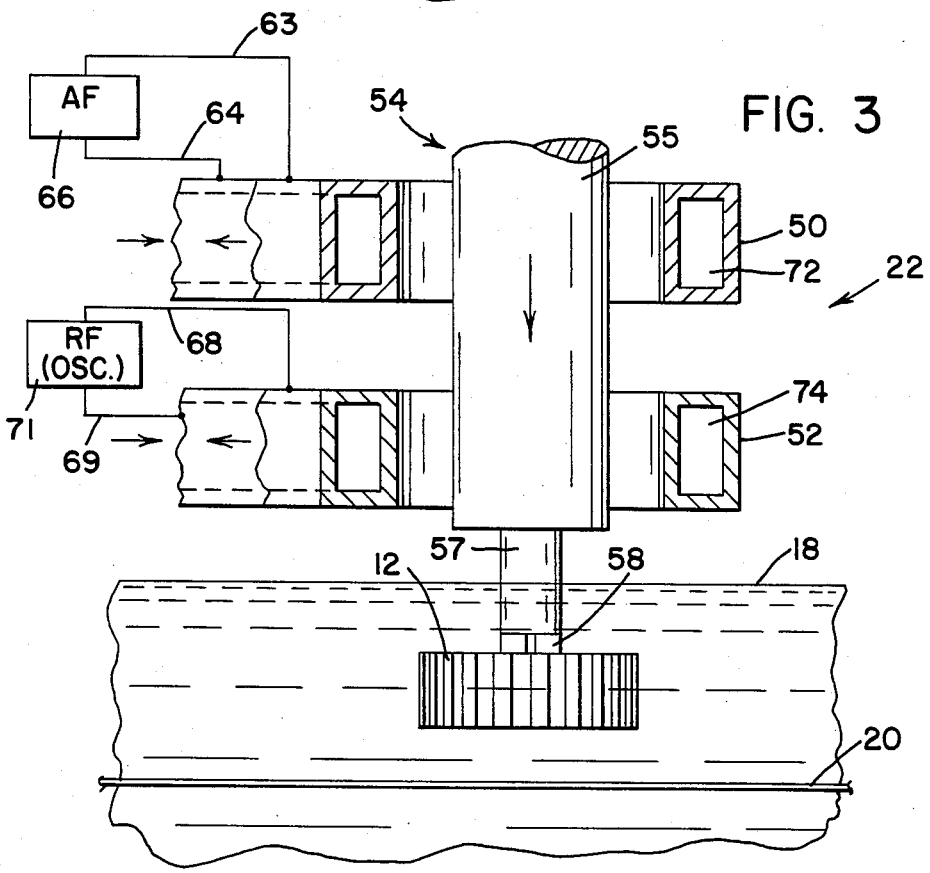
FIG. 3 is an enlarged, partially cross-sectional view similar to FIG. 2, but illustrating the workpiece in a different position.

In accordance with somewhat standard induction heating practice, leads 63, 64 of the first preheat inductor 50 are connected across an alternating power supply 66, which in practice is a solid state inverter having an audio frequency of less than 50 KHz. An appropriate timer feature of a microprocessor (not shown) utilized in conjunction with alternating power supply 66, energizes and deenergizes first preheat inductor 50 at power and for times needed to perform the present invention. Inductor 50 is illustrated as a single turn inductor in the preferred embodiment, although a two turn inductor may be utilized in place thereof. Leads 68, 69 of second, final heating inductor 52 are connected across power supply 71 which in the preferred embodiment, is an oscillator having a high frequency or radio frequency generally over 200 KHz and is likewise controlled in timing cycles by a microprocessor (not shown). Coolant liquid, in accordance with standard practice, is directed through cooling passages 72 of first preheating inductor 50 and passages 74 of final heating inductor 52, the flow of the coolant into and out of first and second inductors 50, 52 being illustrated by the horizontal arrows shown in FIGS. 2 and 3. As shown in FIG. 2, both first and second inductors 50, 52 are adapted to surround the peripheral surface of the workpiece, i.e., the crown of the gear teeth in closely spaced relationship, about 0.05 inches as generally shown as Dimension A in FIG. 2.

Figure 4:
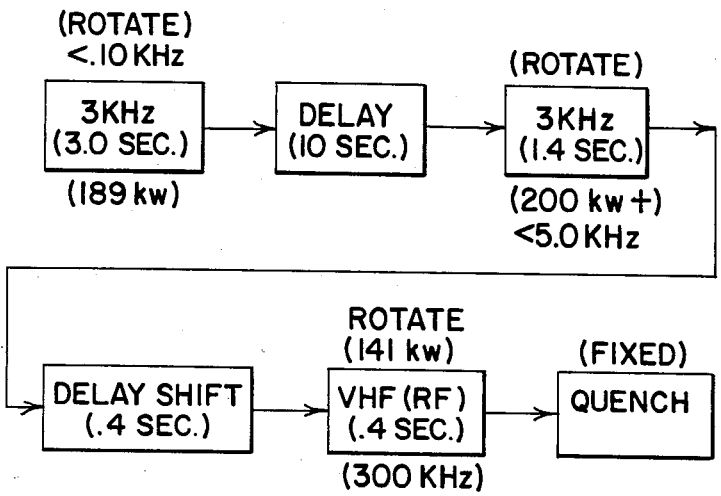
FIG. 4 is a block diagram setting forth the various steps used in heating the workpiece.

Referring now to FIG. 4, the workpiece 12 is removed from tank liquid bath 18 by support structure 54 and accurately positioned by means of rack and pinion drive 61 within first, preheater inductor unit 50 as shown in FIG. 1. In this first position, the alternating frequency of power supply 66 is directed through leads 63, 64 to first preheater inductor 50. In the preferred embodiment, the frequency of power supply 66 is 3.0 KHz nominal. While workpiece 12 is rotated by motor 60 under the control of the microprocessor, power supply 66 supplies over 100 kw of energy at 3.0 KHz. In practice, the high power of the initial preheat cycle is 189 kw and the cycle continues for approximately 3.0 seconds. This first high power cycle of relatively low audio frequency current in the first, single turn, preheat inductor 50 causes heat to flow generally along and slightly beyond the root area of the teeth of workpiece 12 as shown by line B in FIG. 2. This annular band indicated by line B or first heated portion of workpiece 12 has a relatively high temperature while the remainder or the core of the workpiece is at a lower temperature. Thereafter, as shown in FIG. 4, the invention involves a delay of approximately ten seconds. During this delay, the modular portions of high temperature within the first heated portion of the workpiece, i.e., B, will shrink since energy is dissipated in radiation and conduction. After the delay of 10 seconds, workpiece 12 continues to rotate and a second preheat cycle is initiated at 3 KHz or 1.4 seconds. The power of this preheat is substantially the same as the power used in the first preheat cycle. In this instance, the power level is over about 200 kw and the heat profile of the first annular band is enhanced and maintained at a fairly high temperature, slightly below the austenitic critical temperature. All preheating occurs while the core of the workpiece 12 is at a low temperature, certainly not above that of the liquid bath 18 and should a substantial time elapse, conduction and radiation would generally stabilize the temperatures and dissipate the heating profile thus generated. Immediately after the second preheat cycle, the gear is indexed downwardly into the second final heating inductor 52. This index is a rapid downward index taking less than about 0.5 seconds to occur and in practice the shift time is 0.4 seconds. At this time, with the workpiece 12 positioned within the second, final heating inductor 52, a frequency substantially greater than 200 KHz is applied by power supply 71 through leads 68 and 69 to second inductor 52. This frequency, in practice, is 300 KHz at 141 kw for 0.4 seconds. During this high frequency heating, the teeth of workpiece 12 or the second portion of workpiece 12 as indicated by "C" in FIG. 2 is heated above the austenitic critical temperature. At this point, there is a first portion of the workpiece heated to a temperature slightly less than the austenitic critical temperature and a second portion of the workpiece smaller than and contained within the first portion which is heated to a temperature beyond the austenitic critical temperature. Workpiece 12 is then rapidly moved into the liquid bath tank 18 for the die forming operation to occur. As noted, this occurs rapidly but, depending upon the isothermal transformation curve of the material used and the desired heat treatment, the time before the workpiece is plunged into the bath may be controlled to insure obtaining the critical cooling rate.

Figure 7:
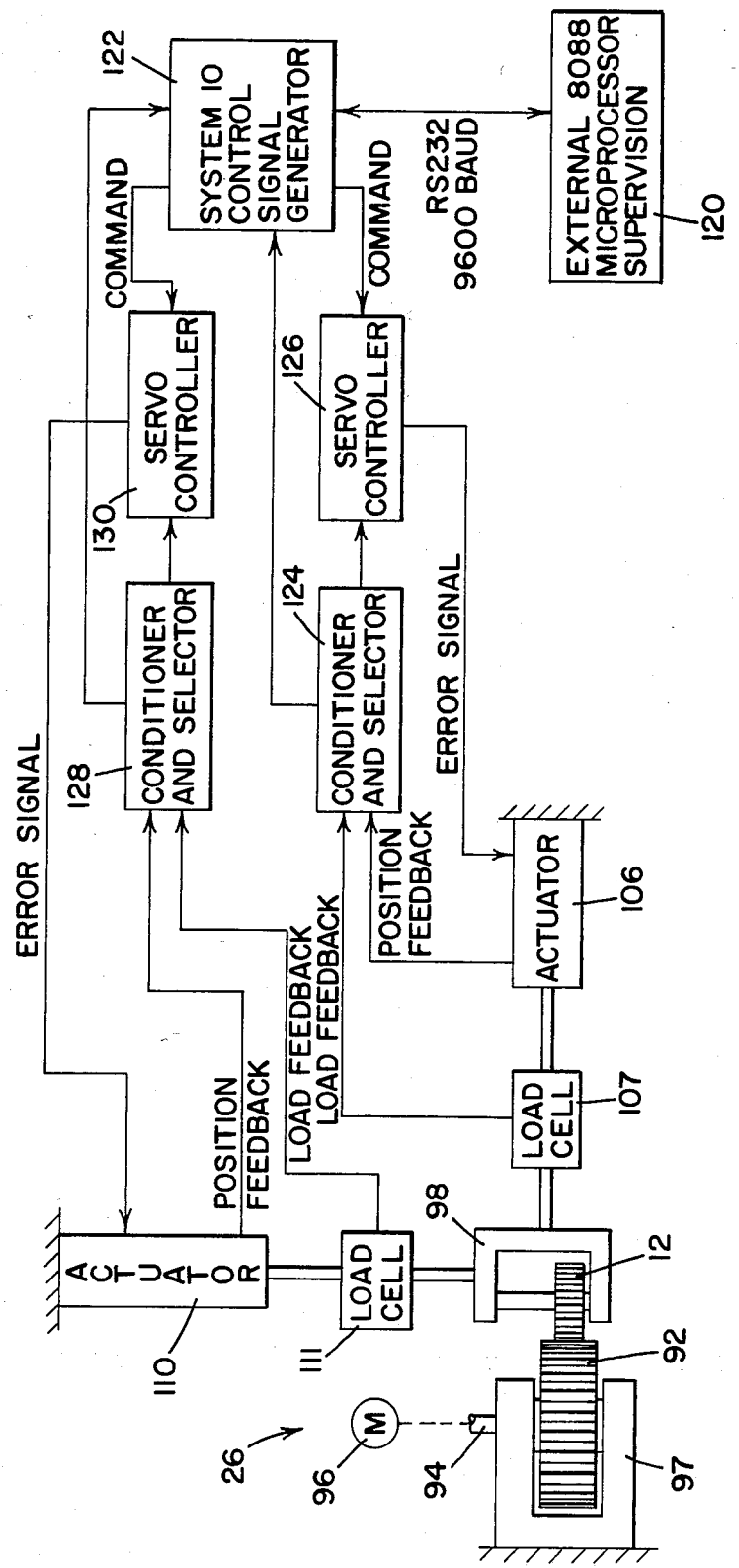
FIG. 7 is a schematic electro-mechanical diagram illustrating the controls used in the forming tool of the present invention.
Figure 8:
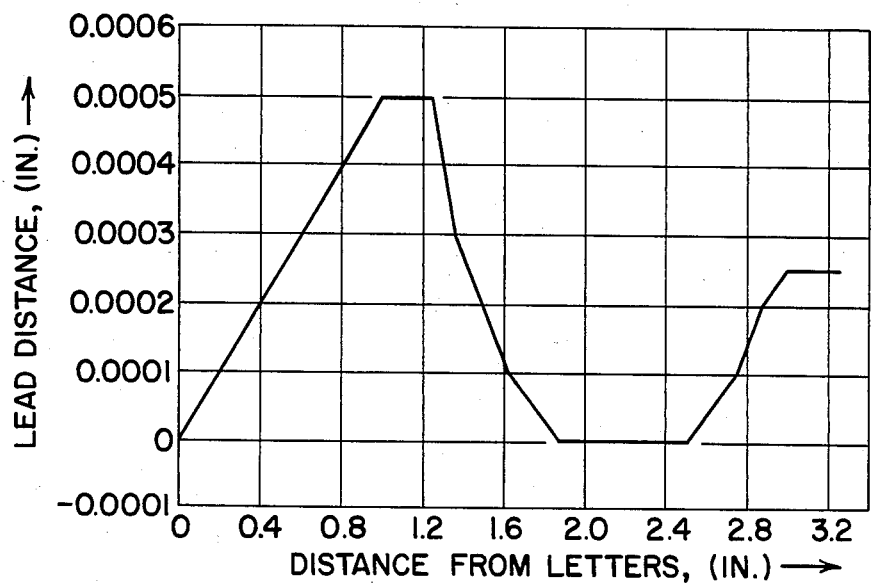
FIG. 8 illustrates the deformation of the workpiece resulting from the forming tool.
Figure 11:
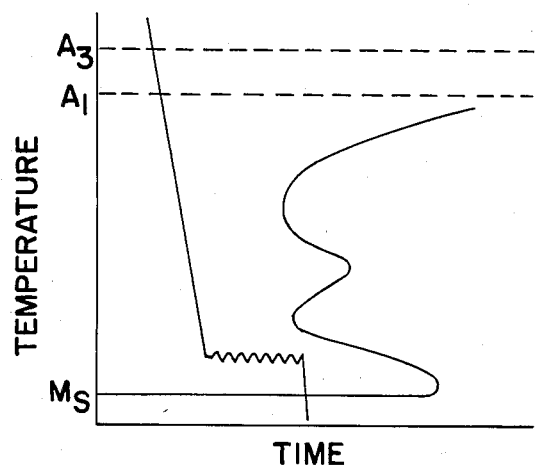
FIGS. 11-20 illustrate isothermal transformation curves with various thermomechanical processes used in the present invention diagramatically superimposed thereon.

Referring now to FIGS. 1, 7 and 8 for a description of the die forming means 26, there is shown in FIG. 1 an entry pivoting structure 80 for transferring the workpiece into die forming means 26 and a similar exit pivoting structure 81 for transferring workpiece 12 out of die forming means 26. Pivoting structure 80 basically comprises an expandable collet 83 attached to an arm 84 which is secured to and pivots about a shaft 86 which is rotatably driven by a motor 87. Shaft 86 is rotatably supported in a plate 89 which is secured to hydraulic cylinder 90 in turn fixed to an immovable framework, thus permitting the pivot arm 84 to move in a verticle direction, pick up a workpiece within the liquid bath tank 18 and move the workpiece into die forming means 26. Similarly, pivoting structure 81 is similarly constructed so as to remove the workpiece 12 from die forming means 26 when the mechanical forming or plastic deformation shaping is completed.

The die forming means comprise a forming tool die 92 which in the preferred embodiment is a rolling gear die similar to a hobbing gear which is rotatably mounted on a shaft 94 for rotation by motor 96. Rotating shaft 94 is securely mounted to a non-movable frame 97 in liquid bath tank 18 to prevent movement of forming tool die 92. Workpiece 12 is contained within a first C-shaped fixture 98 which slidingly engages in the vertical direction, by means of a dovetail joint configuration as at 100, a second C-shape fixture 102 which is movable in a horizontal direction such as by means of rollers 104 or by a tapered wedge, etc. A horizontally-positioned servo-controlled actuator 106 controls the lateral movement of workpiece 12 into gear forming tool 92 and a load cell 107 interposed between horizontal actuator 106 and second C-shape frame member 102 records the lateral forces between forming tool die 92 and workpiece 12. Similarly, a vertically positioned servo-controlled actuator 110 acting against the first C-shaped member 98 controls the vertical position of workpiece 12 relative to forming tool die 92 with the vertical forces exerted on workpiece 12 measured by load cell 111. A hydraulic cylinder 114 is mounted on first movable C-shaped fixture 98 and has an appropriate base portion formed thereon to receive workpiece 12 from the pivoting structure 80. Workpiece 12 is then moved vertically by hydraulic cylinder 114 within first C-shaped movable fixture 98 to its proper position for the roll-swaging or plastic deformation operation, which is then controlled solely by actuators 106, 110. Not shown in the schematic illustration of FIG. 1, are timing gears located on a shaft extending from hydraulic cylinder 114 and the shaft 94 of the gear rolling die to insure synchronization of the workpiece and forming tool die 92.

Referring now to FIGS. 7 and 8, the deformation of workpiece 12 which occurs during the swage-rolling action induced by an entry taper in the gear tooth lead of forming tool die 92 as illustrated in FIG. 8 is controlled by the closed-loop electrohydraulic circuit schematically shown in FIG. 7. An external microprocessor 120 provides a preprogrammed control strategy which senses both position in the horizontal and vertical direction and resistance loads in both directions to control the feed of forming tool die 92. As shown in FIG. 7, external microprocessor 120 supervises through a 9,600 baud serial connection linked with a control signal generator 122 (preferably a Daytronic Systems 10 interface unit)to permit multiplexing of the digitally generated control signal of microprocessor 120. Horizontal actuator 106 which controls the horizontal movement of workpiece 12 includes a transducer (not shown) which consistently generates a horizontal position feedback to horizontal conditioner and selector 124. At the same time, horizontal load cell 107 similarly generates a load feedback signal to horizontal conditioner and selector 124. Horizontal conditioner selector 124 in turn conditions and selects an appropriate signal transmitted to a servo-controller 126 for controlling the horizontal actuator 106 and also an appropriate signal is selected and conditioned and sent to the signal generator 122. The system is under actual position control at all times but during the deformation operation is also in virtual load control vis-a-vis the command signal sent to servo-controller 126, which is generated by signal generator 122 under the control of external microprocessor 120. In this manner, both horizontal load and position, control horizontal actuator 106. Similarly, vertical actuator 110 utilizes a position feedback signal to vertical conditioner and selector 128 which also receives a vertical load feedback signal from load cell 111. Vertical conditioner and selector 128 in turn conditions and inputs an appropriate signal to vertical servo-controller 130 and signal generator 122 which in turn may generate a command signal to servo-controller 130 for controlling the position of vertical servo-controlled cylinder 110. Depending on the alogorithm utilized in microprocessor 120, the vertical and horizontal feeds may be either independent or dependent on one another.

Referring again to FIG. 1, following the deformation operation on workpiece 12 by gear rolling die 92, the workpiece is transferred from the die forming means 26 means of the pivoting structure 81 to conveyor 28 and the exit transfer mechanism 30 (which is similar to the entry transfer mechanism 16) is used to remove workpiece 12 from liquid bath 18. The exit transfer mechanism 30 then places workpiece 12 on an exit conveyor 31 where workpiece 12 is cooled below the $M_s$ temperature by coolant source 32. The coolant source could be air, water or some other liquid directed by nozzle means 33 and a rate sufficient to drop the temperature of workpiece 12 from the $M_s$ temperature to a value approximately or approaching the $M_f$ temperature. Subsequently, workpiece 12 may be subjected to a conventional tempering process.

METHOD DESCRIPTION

Figure 6:
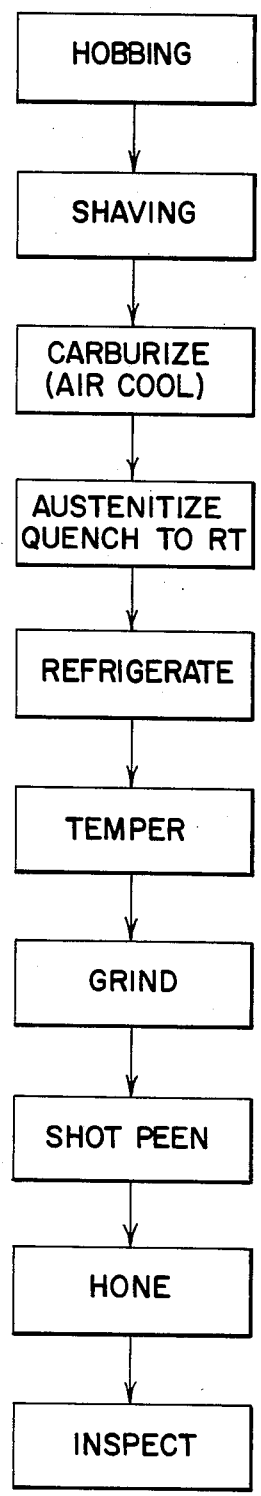
FIGS. 6 and 6a are block diagrams setting forth the various manufacturing steps used to produce a finish workpiece in accordance with the prior art and the present invention, respectively.

As noted above, the method of the present invention finds particular applicability to gears which must be manufactured to extremly close tolerances such as would be encountered in aircraft, helicopter, or nuclear submarine applications. FIG. 6 schematically illustrates some of the manufacturing techniques which must be utilized to produce gears which would be suitable for such applications. The gear teeth are generally formed from a gear blank by gear hob and, for the applications under discussion, a shaving cutter operation is required to remove a few thousandths of an inch of material from the gear teeth. The gear is then subjected to a normal carburizing process to permit the desired case to be formed followed by air cooling to obtain the desired dispersion of the carbides within the case. The gear is then heated above the austenitic critical temperature and quenched at a critical cooling rate to produce the desired martensitic structure. Since retained austenite usually occurs at a higher than acceptable levels, cryogenics or further cooling may be required to reduce the retained austenite to a level of approximately 6 or 7%.

Figure 6A:
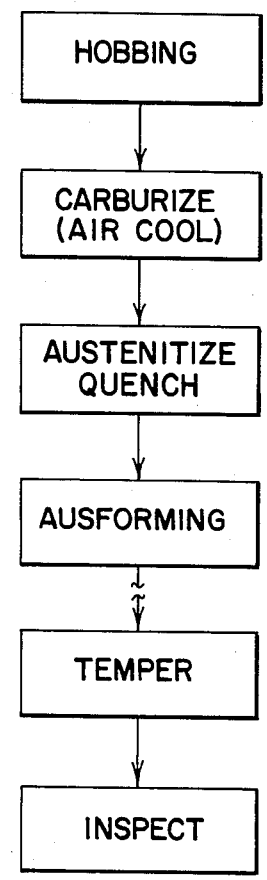

The gear then undergoes a normal tempering operation for stress relieving purposes. The distortion occurring in the teeth following the heat treat operation must now be corrected by grinding either by the forming of the generating process followed by shot peening and honing to produce the desired surface finish whereupon the gear is subjected to intensive inspection tests. Such manufacturing procedure is to be contrasted to that obtained by using the ausrolling process employed in the present invention. As shown in FIG. 6a, there is no need to shave the gear after hobbing since the finished tolerances imposed in the ausforming process will compensate for any lack of tolerance occurring in the hobbing operation. The gear is simply carburized, reheated above the austenitic critical temperature, followed by an interrupted quench where the ausforming occurs. It has been found that the retained austenite is at an acceptable level of 6 to 8% and that a hob gear with an initial gear quality of AGMA 8 has been transformed to AGMA 11. Considerable improvements in surface finish have also resulted eliminating any requirements to either shot peen or hone the gear. Thus, after tempering the gear, only the inspection step need be accomplished.

Figure 9:
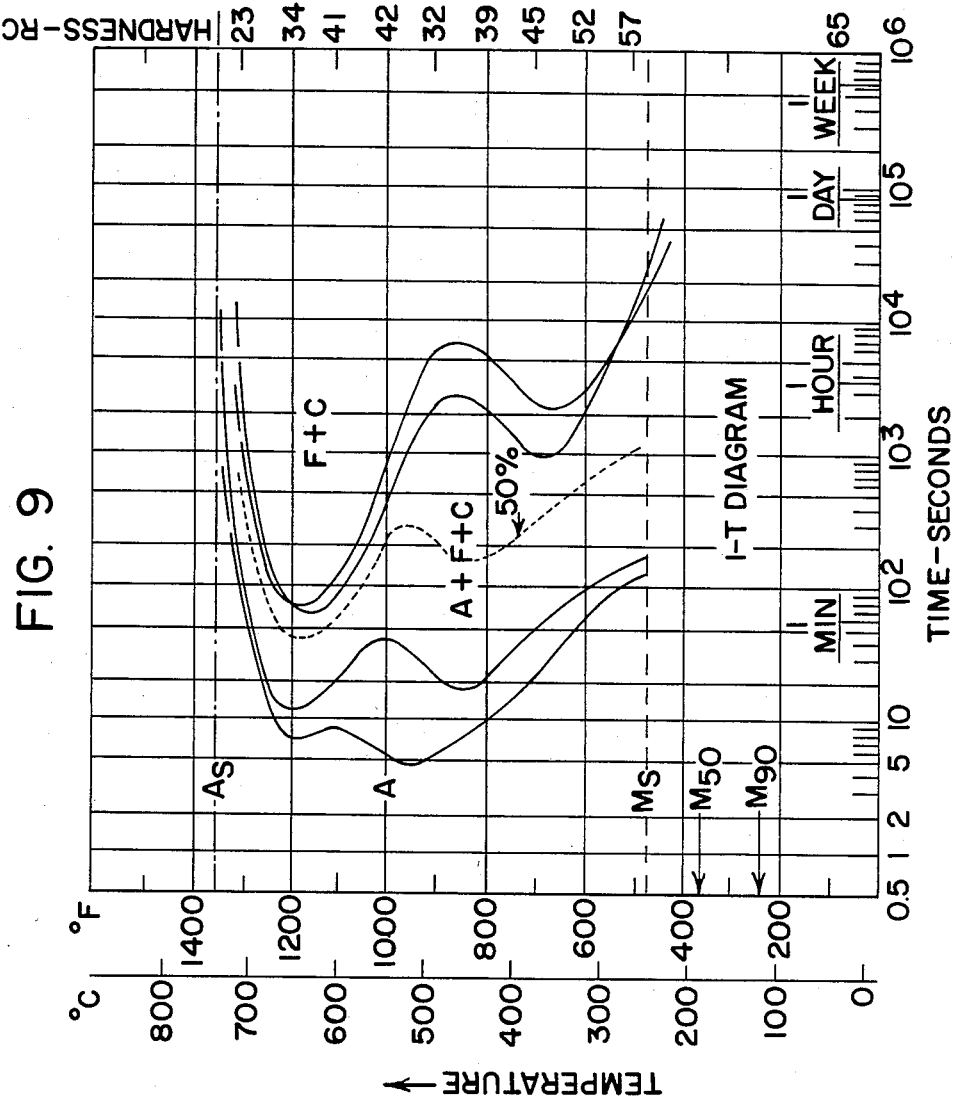
FIGS. 9 and 10 are isothermal transformation curves of preferred steels for the workpiece of the subject invention.
Figure 10:
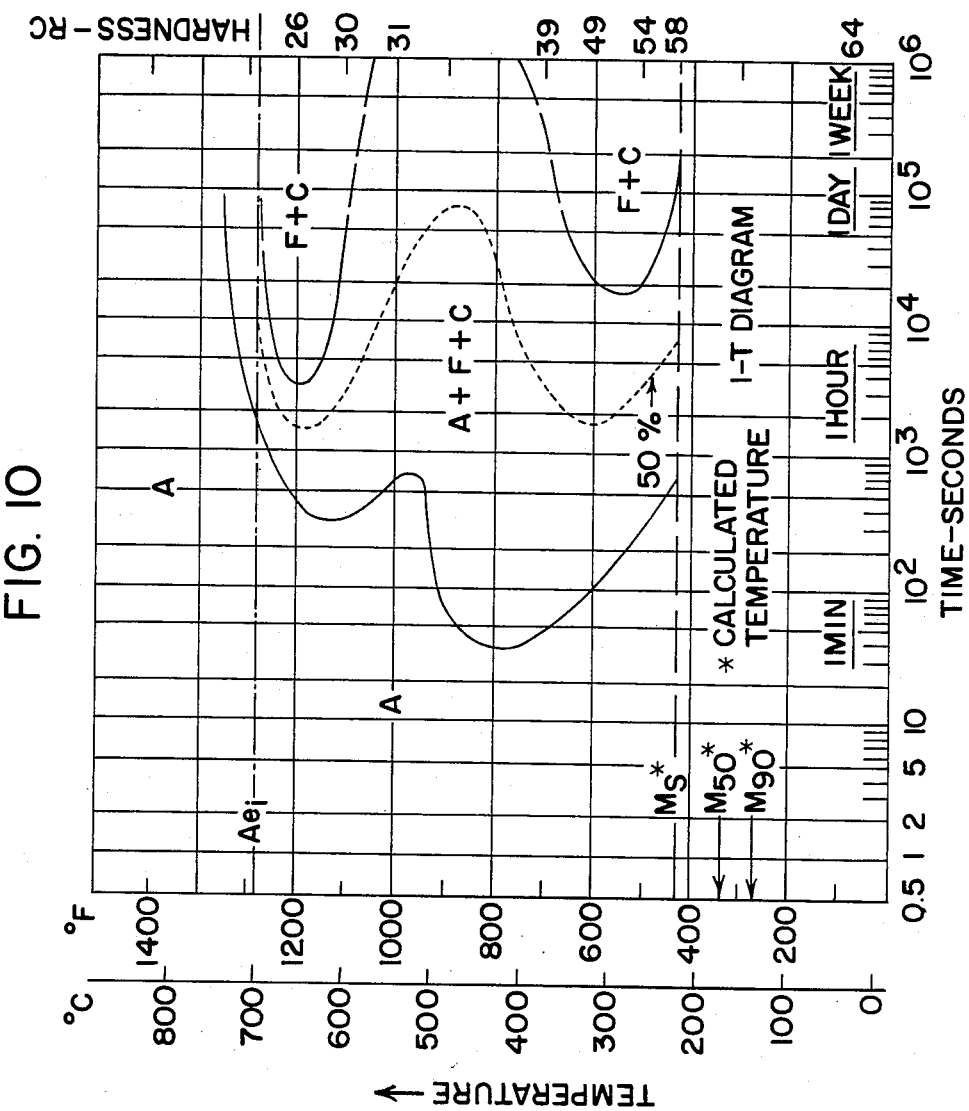
Figure 12:
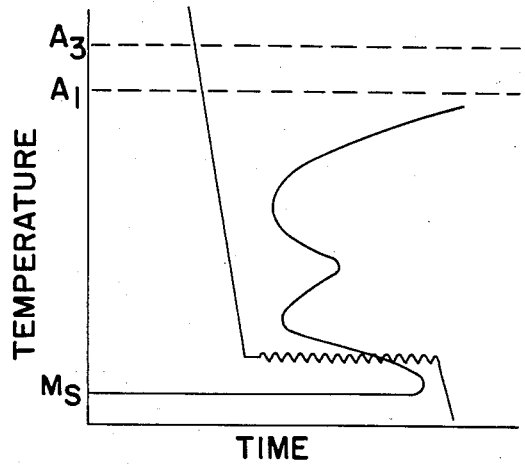
Figure 13:
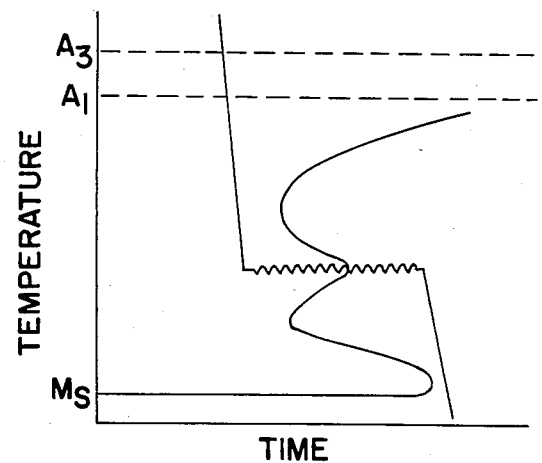
Figure 14:
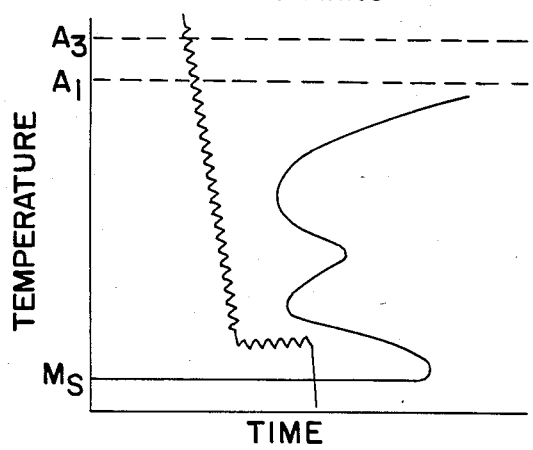
Figure 15:
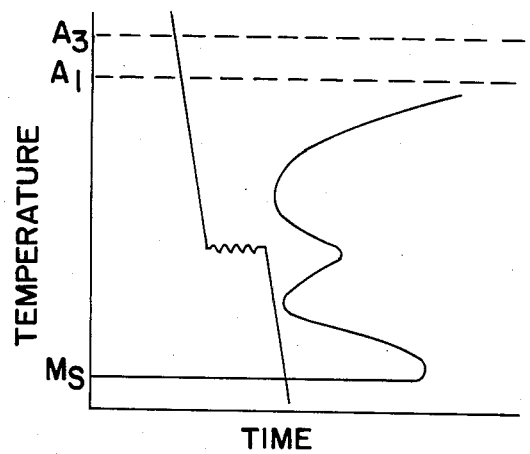
Figure 16:
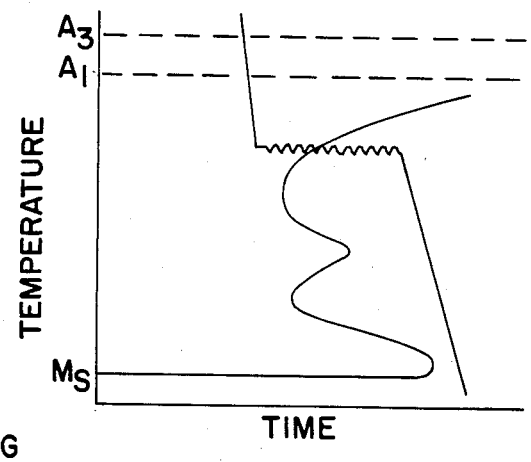
Figure 17:
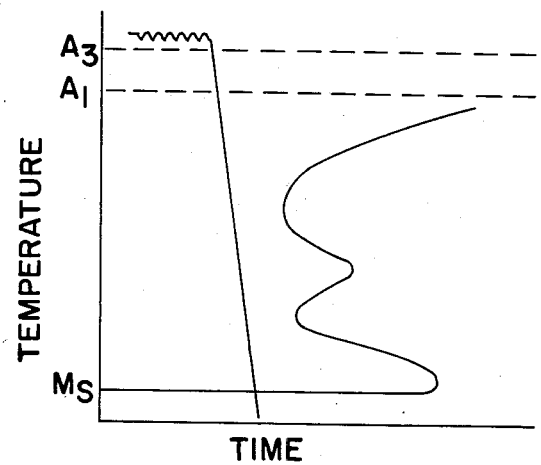
Figure 18:
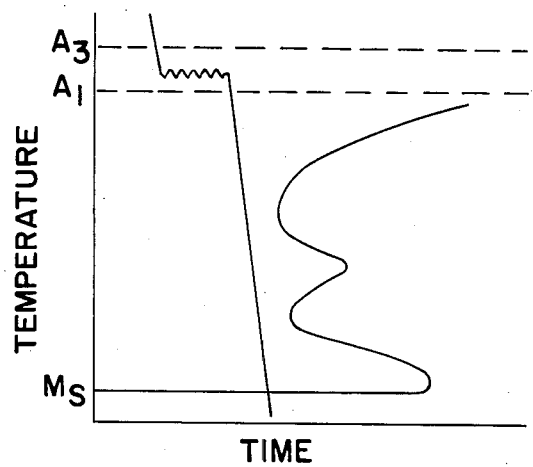
Figure 19:
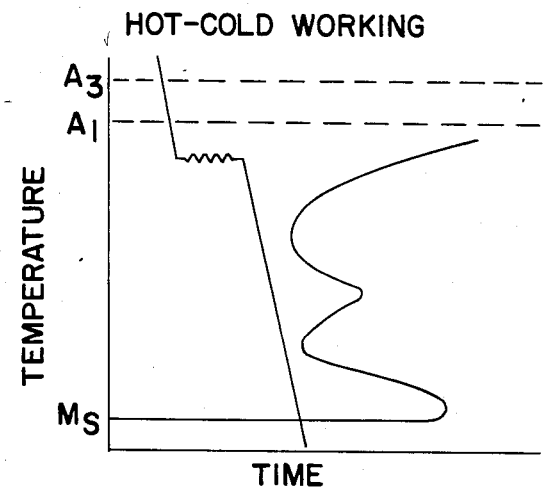
Figure 20:
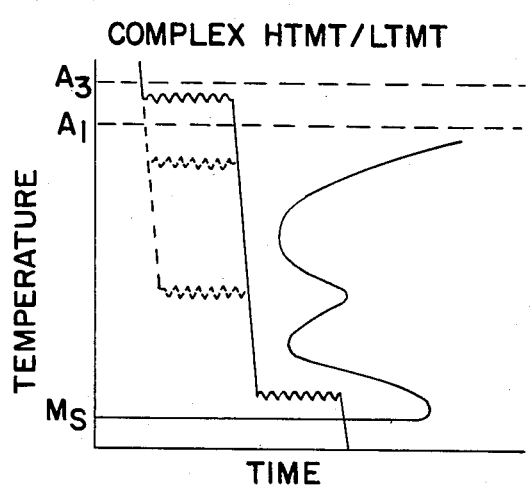

As noted above, it is not intended to limit the subject invention to steels which have been subjected to conventional case hardening heat treatments but to apply the low temperature thermomechanical processing techniques to a wide class of steel and iron alloys such as through-hardened steels, tool steels and austempered ductile iron. In considering steel compositions for such processes, three characteristics of that steel's isothermal transformation curve must be considered, namely, (i) a retarded high temperature transformation time, i.e., the pearlite nose, (ii) a sufficiently deep metastable austenitic region to permit sufficient time for plastic deformation of the material, i.e., the metastable bay and, (iii) a preferably low $M_s$ temperature to permit an ideally low temperature processing. FIGS. 9 and 10 illustrate isothermal transformation curves of 51B70 steel and 4360 steel, respectively. Both curves for both steels are characterized by having a sufficiently retarded pearlite nose and sufficiently large metastable austenitic bay regions to permit application of the subject invention. However, both curves have relatively high $M_s$ temperatures in excess of 440° F. Furthermore, there is a tendency when plastically deforming the work, at least for steels with carburized cases, to increase the $M_s$ temperature. However, it is known that the $M_s$ temperature can be lowered by the addition of carbon and other alloys in accordance with well established and empirical relationships such as that attributed to Andrews or that of Grange and Stewart. The isothermal transformation curves shown in FIGS. 9 and 10 also show the temperature levels below the $M_s$ temperature at which various percentages of martensite are formed.

Figure 5:
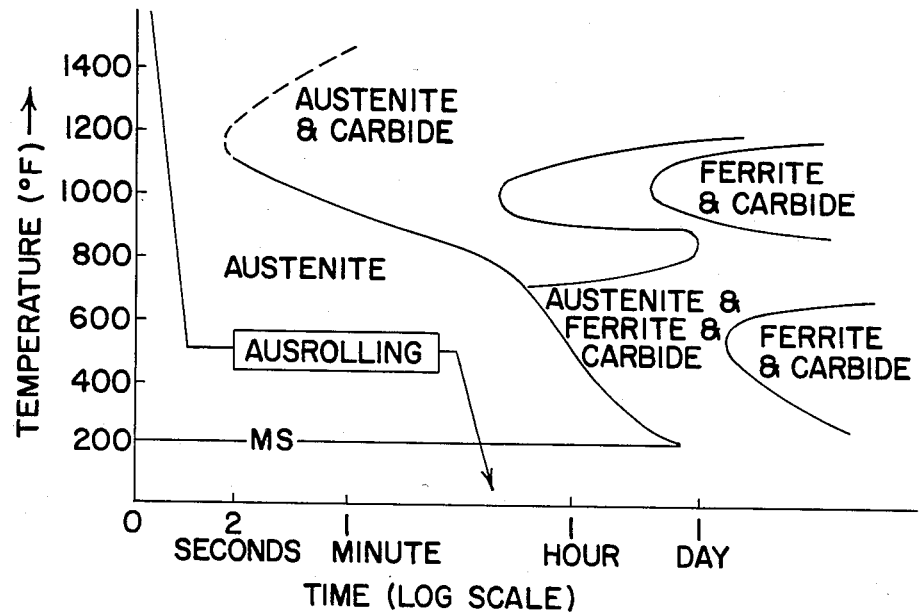
FIG. 5 is an isothermal transformation curve of a workpiece with the ausrolling process diagrammatically illustrated thereon.

The isothermal transformation curve shown in FIG. 5 is that of the carburized steel typically employed in the description of the preferred embodiment above with the ausrolling cooling curve superimposed thereon. The workpiece is generally heated above the austenitic critical temperature to a temperature of approximately 1600°–1700°, and is then quenched at a critical cooling rate sufficient to pass the pearlite knee of the isothermal transformation curve. The ausrolling process is conducted at a temperature approximately between 400°–60020 F., although it is contemplated that the plastic deformation could occur at a temperature range of anywhere between 200°–900° F.

The isothermal transformation curves illustrated in FIGS. 11 through 20 disclose various ausforming and isoforming processes where the saw tooth configurations of the cooling curves superimposed on the isothermal transformation curve indicate mechanical working or plastic deformation of the workpiece in accordance with the teachings of the subject invention. Depending upon the desired physical properties of the workpieces, select thermomechanical processing curves may be utilized.

Figure 21:
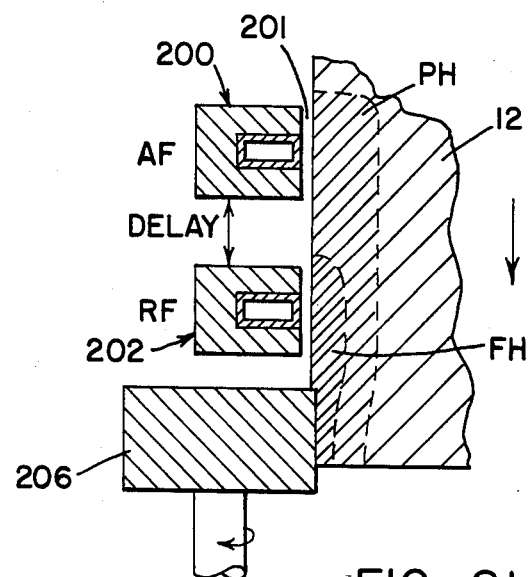
FIG. 21 illustrates a cross-sectional, schematic view of an alternative embodiment of the invention.

Referring now to FIG. 21, there is shown an alternative embodiment falling within the scope of the invention and particularly suited to isoforming processes conducted on workpiece 12 which are carried out without the need of a liquid bath. In the embodiment of FIG. 21, a cylindrical apparatus such as shown at 54 in FIG. 1 supports workpiece 12 in a vertical position and is capable of precise vertical movements of workpiece 12 from a first preheat inductor 200, to a second final heat inductor 202 and then to a die forming tool 206 which is rotatably driven by a motor (not shown) on a movable frame drive in an axial direction by a servo-controlled actuator (also not shown) to engage in rolling-swaging contact with workpiece 12 for achieving plastic deformation on the surface thereof. Inductors 200 and 202 are similar to the inductors disclosed in FIGS. 2 and 3 and are adapted to closely surround workpiece 12 to produce an air gap 201 in accordance with standard practice. Inductor 200 is powered by an audio frequency power supply (not shown), preferably a solid state invertor having an output between 3-10 KHz. As in the preferred embodiment, it is contemplated that inductor 200 will be operated for at least two heating cycles separated by a time interval to preheat a first portion of workpiece 12 as shown by the letters "PH" in FIG. 21 to a temperature slightly below the austenitic critical temperature and preferably about 900° F. The workpiece is then rapidly moved into the final heat inductor 202 which is powered by a radio frequency power supply (not shown), preferably a radio frequency oscillator having a frequency about 100-450 KHz and preferably a frequency above 200 KHz. Second inductor finally heats the second portion of the workpiece, shown by letters "FH" in FIG. 21 and which is smaller than and contained within the first "PH" portion to a temperature above the austenitic critical temperature. Workpiece 12 is then moved into contact with die forming tool 206 while the "FH" portion of the workpiece rapidly drops in temperature to below the austenitic critical temperature.

In the manner thus described, the workpiece 12 can be progressively preheated, heated and then plastically deformed by mechanical deformation in a somewhat continuous operation. If the time for the plastic deformation becomes too limiting, the second preheat step can be replaced by another audio frequency inductor placed upstream of first inductor 200. It is contemplated that a microprocessor controlled, closed-loop electrohydraulic circuit, similar to that disclosed in FIG. 7 can be used in the embodiment shown in FIG. 21. The control will always be forming tool position sensitive but capable of generating an overriding load induced command signal to the servo-controlled actuator which signal (in addition to the position sensing signal) can also control the power and frequency levels of inductors 200, 202, as well as the transfer times between the inductors 200, 202 and between the inductor 202 and die forming tool 206. As noted above, should the dissipation of the heat from the second portion, the "PH" portion, drop the temperature of the "PH" portion to an unacceptable level, the load on the die forming tool 206 will increase to a level which could trigger a retraction of the workpiece 12 into inductors 200 and 202 for reheating, the forming operation then progressing from that point where it had been initially stopped.

The invention has been described with reference to a preferred embodiment. Obviously, other modifications and alterations will occur to others upon reading and understanding the specifications. It is my intention to include all such modifications and alterations insofar as they come within the scope of the present invention.

It is thus the essence of my invention to provide an improved method and apparatus for heating a selected portion of a workpiece which enhances the utilization of ausforming, ausrolling and/or isoforming processes.

Having thus described the invention, it is hereby claimed:

1. A method for finish forming and heat treating a preselected portion of a ferrous workpiece comprising the steps of:
   (a) preheating a preselected first portion of said workpiece to a temperature at least equal to the approximate $M_s$ temperature, but less than the austenitic temperature of said workpiece;
   (b) heating a second portion of said workpiece to a temperature at least equal to the austenitic temperature for said workpiece, said second portion smaller than and contained within said first portion;
   (c) forming the desired shape of said workpiece by means of a shaping tool mechanically deforming said second portion before said second portion drops in temperature below said $M_s$ temperature; and,
   (d) cooling said workpiece below said $M_s$ temperature.

2. The method of claim 1 wherein said first portion extends from the peripheral edge of said workpiece inward for a predetermined distance and said second portion extends from the peripheral edge of said workpiece a lesser inward distance.

3. The method of claim 2 further including the steps of submerging said workpiece after heating said second volume in a liquid bath maintained at a temperature at least equal to said $M_s$ temperature and removing said workpiece from said bath after completing said forming step.

4. The method of claim 3 wherein preheating said first portion of said workpiece above the $M_s$ temperature is achieved by providing a first induction coil having a workpiece receiving opening adapted to surround in closely spaced relationship said first portion of said workpiece and energizing said first induction coil with a low radio frequency.

5. The method of claim 4 wherein heating said second portion of said workpiece above the austenitic temperature is achieved by providing a second induction coil having a workpiece receiving opening adapted to surround in closely spaced relationship said second portion of said workpiece and energizing said second induction coil with a high radio frequency.

6. The method of claim 5 further comprising the steps of energizing said first coil with said low radio frequency for a first time period, de-energizing said second coil for a second time-delay period, re-energizing said second coil for a third time period shorter than said first time period, immediately transferring said workpiece into said second coil and energizing said second coil at high radio frequency for a time period less than said first time period.

7. The method of claim 6 wherein said low radio frequency is about 10 KHz or less and said high radio frequency is about 100 KHz or more, said time-delay period is about 10 seconds or less.

8. The method of claim 7 further including the step of rotating the workpiece when either the first or second coil is energized.

9. The method of claim 5 further including the step of holding the workpiece in said liquid bath until the temperature of said second portion drops to a predetermined temperature above the $M_s$ temperature before forming said workpiece.

10. The method of claim 9 further including the step of maintaining the liquid bath at a predetermined temperature above the $M_s$ temperature which is sufficient to establish a critical cooling rate for said workpiece.

11. The method of claim 10 wherein said forming step occurs while said second portion of said workpiece is maintained as metastable austenite.

12. The method of claim 10 wherein said bath is maintained at a predetermined temperature above the $M_s$ temperature and the time period of mechanically working said workpiece by said die is controlled to insure an isoforming process.

13. The method of claim 10 further including the step of tempering said workpiece after cooling said workpiece.

14. A method for contour forming a ferrous workpiece within close tolerances while performing a surface hardening of said workpiece's contour comprising the steps of:

(a) inductively preheating the contour of said workpiece to a temperature approximately equal to the $M_s$ temperature of said workpiece, said contour being heated at said temperature to a first depth;

(b) inductively heating the contour of said workpiece to a temperature at least equal to the austenitic temperature of said workpiece to a second depth not greater than said first depth;

(c) immediately submerging said workpiece in a liquid bath at a temperature approximately equal to said $M_s$ temperature;

(d) forming the contour of said workpiece to a desired shape by means of a forming die while said workpiece is in a plastic state; and, (e) cooling said workpiece at a rate sufficient to impart desired physical properties to said workpiece.

15. The method of claim 14 wherein preheating said first portion of said workpiece above the $M_s$ temperature is achieved by providing a first induction coil having a workpiece receiving opening adapted to surround in closely spaced relationship said first portion of said workpiece and energizing said first induction coil with a low radio frequency.

16. The method of claim 15 wherein heating said second portion of said workpiece above the austenitic temperature is achieved by providing a second induction coil having a workpiece receiving opening adapted to surround in closely spaced relationship said second portion of said workpiece and energizing said second induction coil with a high radio frequency.

17. The method of claim 16 further comprising the steps of energizing said first coil with said low radio frequency for a first time period, de-energizing said second coil for a second time-delay period, re-energizing said second coil for a third time period shorter than said first time period, immediately transferring said workpiece into said second coil and energizing said second coil at high radio frequency for a time period less than said first time period.

* * * * *

UNITED STATES PATENT AND TRADEMARK OFFICE
CERTIFICATE OF CORRECTION

PATENT NO. : 4,744,836
DATED : May 17, 1988
INVENTOR(S) : George D. Pfaffmann

It is certified that error appears in the above-identified patent and that said Letters Patent is hereby corrected as shown below:

Column 5, line 11, "radio" should read --- audio ---; lines 12 and 13, "second" should read --- first ---; line 17, "first" should read --- second ---. Column 9, line 32, "or" should read --- for ---. Column 11, line 50, "extremly" should read --- extremely ---. Column 14, claim 3, line 4, "volume" should read --- portion ---; Claim 4, line 7, "radio" should read --- audio ---; claim 6, line 2, "radio" should read --- audio ---; lines 3 and 5, "second" should read --- first ---. Column 15, claim 7, line 1, "radio" should read --- audio ---. Column 16, claim 15, lines 2 and 5, "first portion" should read --- contour ---; line 7, "radio" should read --- audio ---. Claim 17, line 2, "radio" should read --- audio ---; lines 4 and 5, "second" should read --- first ---.

Signed and Sealed this

Third Day of November, 1992

*Attest:*

DOUGLAS B. COMER

*Attesting Officer*  *Acting Commissioner of Patents and Trademarks*